R. P. BOLTON.
METHOD OF ACCELERATING THE DEPOSITION OF SOLIDS IN SEWAGE EFFLUENTS.
APPLICATION FILED NOV 25, 1914.
1,202,474.  Patented Oct. 24, 1916.
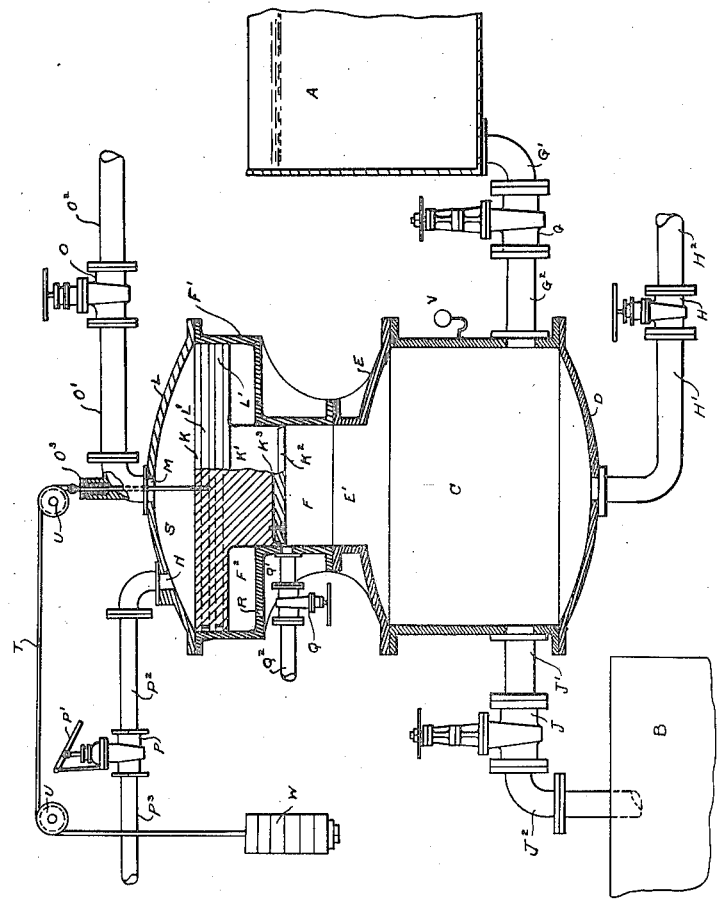
WITNESSES:
INVENTOR
Reginald Pelham Bolton,
BY
ATTORNEY

UNITED STATES PATENT OFFICE.

REGINALD PELHAM BOLTON, OF NEW YORK, N. Y., ASSIGNOR OF ONE-THIRD TO ARTHUR WILLIAMS AND ONE-THIRD TO EDMUND F. TWEEDY.

METHOD OF ACCELERATING THE DEPOSITION OF SOLIDS IN SEWAGE EFFLUENTS.

1,202,474. Specification of Letters Patent. Patented Oct. 24, 1916.

Application filed November 25, 1914. Serial No. 873,887.

*To all whom it may concern:*

Be it known that I, REGINALD PELHAM BOLTON, a citizen of the United States of America, residing at New York, in the county and State of New York, have invented certain new and useful Improvements in Methods of Accelerating the Deposition of Solids in Sewage Effluents, of which the following is a specification.

My invention relates to the disposal of sewage and particularly to a method of accelerating the deposition of solids in sewage effluents and of releasing contained gases, and it consists, primarily, in reducing the size of the solids by compression and expelling contained gases or detaching adhering globules, thus rendering the matter more dense and decreasing its support, so that it will more readily sink in the liquid, and secondarily, in releasing the pressure suddenly, whereby the globules or bubbles of gas are expanded or exploded so that they no longer aid in supporting the solids.

The elimination of solid matters in sewage by mechanical screening is effective only to a certain size of the particles of matter carried in the liquid. The larger particles and solid objects are readily arrested thus, but heretofore the elimination of the fine particles has required filtration, or a long period of gradual deposition.

Numerous attempts to solve the problem by using processes of a chemical and electrical nature have been made, the majority of which are expensive or complex or ineffective, but upon careful consideration of the cause and circumstances of the flotation of such fine materials in sewage, I have devised a method for their more rapid deposition, of a simple and effective character.

My complete method consists in the application of an intense pressure and a sudden release thereof. The pressure is exerted upon the liquid sewage. Thereby the contained particles or aggregations of matter, of a solid, fibrous or spongy character, are compressed and reduced in size and thus rendered incapable of suspension in the liquid.

Since pressure applied to a liquid confined in a closed vessel or cylinder is exerted equally upon all parts of any object therein, any aggregation of material or particle of matter suspended in the liquid, is subjected to pressure in every direction, which compresses it and reduces its displacement. Upon being thus reduced in size, the particle will displace less liquid and therefore be sustained by a correspondingly decreased supporting power. Consequently its descent will be accelerated in proportion to its reduction in size.

My complete method includes further the sudden release of the applied pressure for the purpose of detaching gases, which are attached to, or combined with, or contained in the floating materials. Materials which of themselves are heavier than water are often suspended therein by such contained or attached gases. Thus, fibrous material is composed of cells containing air or gas which aids in displacing sufficient liquid to cause the suspension of the fibrous material or to retard its deposition. Many times bubbles of gas, formed by decomposition, are attached to particles of solid matter with a similar effect. Such gases when subjected to severe compression are reduced to a lesser size of globule and thus afford less buoyancy to the solid. If in the form of a bubble, then compression and sudden release gives them an opportunity of releasing themselves from any particles to which they have become attached. Upon the release of the pressure, interior gases suddenly expand or explode and tear the containing material apart, and gases attached as bubbles will release themselves from the objects or materials to which they are attached. Thus, a pressure upon the water of a thousand pounds per square inch or 66 atmospheres, which could be readily and inexpensively applied, would have the effect of reducing a globule of gas to one-sixty-sixth of its volume, in which condition the sudden release of pressure would leave it free to explode with a force due to its compressed conditions, capable of tearing asunder, with relatively severe force, any confining material, or violently detaching itself from any attachment to mechanical objects. Then, too, the form of globule or bubble of air attached to a floating object, is hemispherical, its attachment to the object being by its flattened base. Upon the application of higher hydraulic pressure, the bubble must become more and more spherical, since the pressure is equally exerted at all parts of its form. Its contact with the object and its hold upon the object would be thus reduced in area, and, under increasing pressure, it would gradually release itself altogether. Now if the pressure were suddenly released, it would as suddenly explode, and be torn asunder, changing its shape and depriving it of its ability to hold fast to the object. The method by which I propose to accomplish these results without the exertion of excessive energy, is to utilize the flow of the sewage, by gravity, to fill a closed cylinder, receptacle, or drum, above which is a cylinder, in which is a plunger which forms a part, or an extension of a much larger piston, contained in another cylinder, superimposed on that in which the plunger works. When the chamber under the plunger is thus entirely filled, pressure of water or of steam or of air, may be applied to the upper side of the large piston, which imparts to the confined liquid a pressure corresponding to the difference between its larger area and that of the smaller plunger.

As water is practically incompressible, the only movement of the compressing plunger or piston which is required, is that amount due to the proportionate volume of any air, gas, fibrous or spongy materials contained in the sewage, so that the expenditure of energy by the movement of the piston and plunger is limited. One form of apparatus, adapted for use in practising my aforesaid method, is shown in the accompanying drawing which is a diagrammatic representation of the apparatus, the sewage tank "A" and the pressure tank being shown in section.

The sewage tank "A" and the liquid receiving tank "B", are not necessary parts, since the sewage may be received and the liquid discharged without the use of the tanks, but when used, "A" is preferably on a higher level and "B" on a lower level than the pressure tank.

The pressure apparatus consists of a cylindrical chamber or tank "C" provided with a sewage inlet $G^2$ controlled by valve G and a sludge outlet H' controlled by valve H, and a liquid outlet J' controlled by a valve J. The chamber "C" is closed at the bottom by a base "D" and at the top by a cover "E" having a cylindrical opening E' of smaller diameter than that of cylinder "C". Above the opening E' and connected therewith by a reduced cylindrical extension F, is a larger cylinder F' which with E' constitutes the upper pressure chamber which is closed by a cover L provided with a supply opening M, controlled by a valve O, and an exhaust opening N, controlled by a quick acting valve P having a hand lever $p'$. Pipes O' and $O^2$ lead to and from valve O and pipes $P^2$ and $P^3$ lead to and from valve P. In this upper pressure cylinder I locate a piston K fitting the part F' and an extension K' fitting part F, K being provided with spring rings L', L' and K' with a junk ring or platen $K^2$ holding a cup-leather packing $K^3$ in place under the piston or plunger K'. R is an orifice in the cylinder F' to permit the passage of air from space $F^2$.

S is a steel stud or rod secured in piston K, passing through gland $O^3$ in the usual manner and secured to a wire rope or chain T, passing over pulleys U and U' and supporting a weight W proportioned to overbalance the weight of piston K K'. Just below the face of plunger K', when at its upper limit of movement, I provide a gas outlet which, as shown, is composed of pipes Q' $Q^2$ and a controlling valve Q, (though I do not limit myself to that exact arrangement) and a pressure gage V is preferably connected to the cylinder C. With all valves closed, except valve Q, and the piston in the position shown, sewage is admitted to chamber C by opening valve G. It is permitted to rise therein, expelling the air through valve Q. When it reaches the under side of $K^2$, valves Q and G are closed and valve O is opened, admitting pressure (water, air or steam) on top of piston K, which is thereby forced down until the desired pressure is indicated by gage V. A sudden release of the pressure is then effected by quickly raising lever P', thus opening valve P whereby the water, steam, or air can be instantly relieved and exhausted. The weight will then lift the piston K and plunger K' off the sewage, the gases which form in chamber C rise to space E' and, by opening valve Q, these gases are permitted to escape either to the atmosphere or, if required, to an air pump. After a sufficient time, valve J is opened and the clarified liquor is allowed to draw off to tank B. Valve H is then opened and the sludge withdrawn by gravity or by a pump to a suitable receptacle. After the chamber is empty, all valves except Q are closed and the process described is repeated.

The application of pressure, as described will have consolidated the solid, fibrous or spongy matter suspended in the liquid sewage and have compressed the globules of gas, and the sudden release of that pressure will have resulted in the described expansion or explosion of said globules and their detachment from the suspended matter thereby accelerating the deposition of said suspended matter as already set forth. Good results may be attained by using a suitable pressure which is not suddenly released, but a much better result is reached by employing all the forces of the complete method.

What I claim as my invention and desire to secure by Letters Patent is:—

1. The method of accelerating the deposition of solids in sewage effluents, which consists in subjecting said effluents to pressure and suddenly releasing said pressure, all substantially as set forth.

2. The method of accelerating the deposition of sewage effluents, which consists in intermittently applying to said effluents, a pressure other than that due to the depth of the liquid containing the solids to be precipitated and sufficient to condense said solids, and permitting the solids to settle, all substantially as set forth.

3. The method of accelerating the deposition of solids in sewage effluents, which consists in placing the sewage in a vessel, closing said vessel, intermittently subjecting the contents to a pressure other than that due to the depth, above the solid, of the liquid containing the solid to be precipitated and suitable to condense said solids and then permitting them to settle, all substantially as set forth.

4. The method of accelerating the deposition of solids in sewage effluents, which consists in placing the sewage in a vessel, closing said vessel, intermittently subjecting the contents to a pressure other than that due to the depth, above the solid, of the liquid containing the solid to be precipitated and suitable to condense said solids and to free them from gases and then permitting them to settle, all substantially as set forth.

5. The method of accelerating the deposition of solids in sewage effluents, which consists in placing the sewage in a vessel from which the air is permitted to escape, closing the vessel, subjecting the contents to a pressure suitable to condense said solids, releasing the gases which separate from the liquid and permitting the solids to settle, all substantially as set forth.

6. The method of accelerating the deposition of solids in sewage effluents, which consists in placing the sewage in a vessel, closing the vessel, subjecting the contents to a pressure suitable to condense said solids, relieving the pressure, releasing the gases which separate from the liquid and permitting the solids to settle, all substantially as set forth.

In testimony whereof, I have signed my name to this specification in the presence of two subscribing witnesses, this twenty-third day of November 1914.

REGINALD PELHAM BOLTON.

Witnesses:
FREDERICK A. FORGEE,
ERIC I. BOLTON.